US012572480B2

(12) United States Patent
Tran et al.

(10) Patent No.: US 12,572,480 B2
(45) Date of Patent: Mar. 10, 2026

(54) APPARATUS AND METHOD FOR SELECTING DYNAMIC LATENCY FOR LEVEL 2 CACHE

(71) Applicant: Condor Computing Corporation, San Jose, CA (US)

(72) Inventors: Thang Tran, Austin, TX (US); Shashank Nemawarkar, Austin, TX (US); Raul Garibay, Austin, TX (US)

(73) Assignee: Condor Computing Corporation, San Jose, CA (US)

( * ) Notice: Subject to any disclaimer, the term of this patent is extended or adjusted under 35 U.S.C. 154(b) by 270 days.

(21) Appl. No.: 18/238,098

(22) Filed: Aug. 25, 2023

(65) Prior Publication Data

US 2023/0409489 A1     Dec. 21, 2023

Related U.S. Application Data

(63) Continuation-in-part of application No. 17/697,870, filed on Mar. 17, 2022, now Pat. No. 11,954,491, and a continuation-in-part of application No. 17/697,865, filed on Mar. 17, 2022, now Pat. No. 11,829,762, and a continuation-in-part of application No. 17/672,622, filed on Feb. 15, 2022, now Pat. No. 11,829,767, said application No. 17/697,870 is a continuation-in-part of application No. 17/588,315, filed on Jan. 30, 2022, now Pat. No. 11,829,187, said application No. 17/697,865 is a continuation-in-part of application No. 17/588,315, filed on Jan. 30, 2022, now Pat. No. 11,829,187, said application No. 17/672,622 is a continuation-in-part of application No. 17/588,315, filed on Jan. 30, 2022, now Pat. No. 11,829,187.

(51) Int. Cl.
*G06F 12/128*          (2016.01)

(52) U.S. Cl.
CPC .................................. *G06F 12/128* (2013.01)

(58) Field of Classification Search
CPC ..................................................... G06F 12/128
See application file for complete search history.

(56) References Cited

U.S. PATENT DOCUMENTS

| | | | | |
|---|---|---|---|---|
| 8,966,457 | B2 * | 2/2015 | Ebcioglu ................. | G06F 12/08 |
| | | | | 717/136 |
| 10,593,380 | B1 * | 3/2020 | Volpe ...................... | G06F 17/18 |
| 2004/0221111 | A1 * | 11/2004 | Phelps ................ | G06F 12/0862 |
| | | | | 711/137 |
| 2022/0197519 | A1 * | 6/2022 | Kuo ...................... | G06F 3/0634 |

* cited by examiner

*Primary Examiner* — Zachary K Huson
(74) *Attorney, Agent, or Firm* — Artie Pennington Law Offices, PLLC; Artie Pennington; Hannah Ward

(57)          ABSTRACT

A processor includes a time counter and issuing instruction and executing instruction at a future time which is based on the time counter. The execution times are based on fixed latency times of instructions with exception of the load instruction which is based on the data cache hit latency time. A data cache miss causes the load instruction to fetch data from the level 2 cache wherein a time tracker unit adjusts the level 2 cache latency time based on a counter.

14 Claims, 6 Drawing Sheets

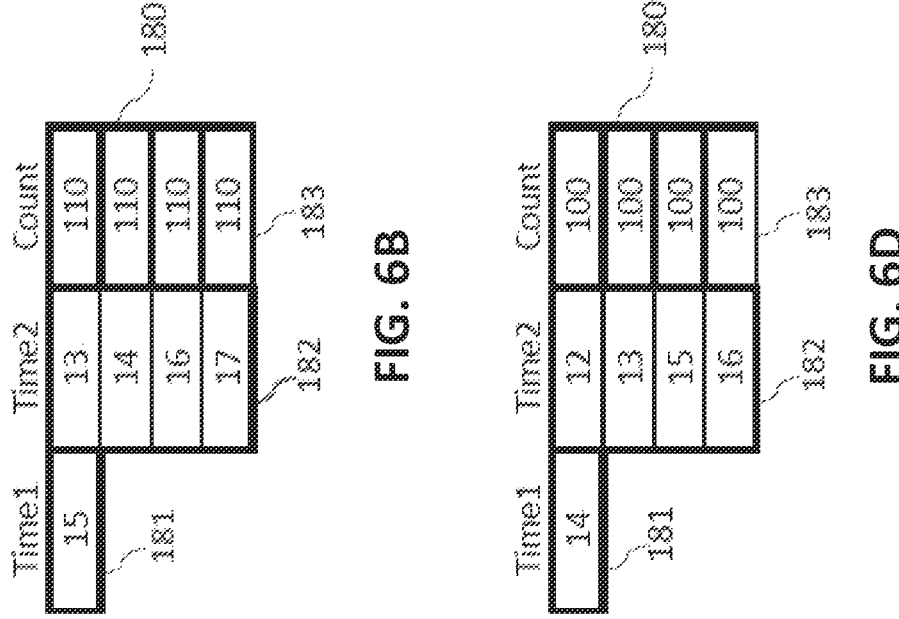
| Time1 | Time2 | Count |
|-------|-------|-------|
| 15    | 13    | 110   |
|       | 14    | 110   |
|       | 16    | 110   |
|       | 17    | 110   |
FIG. 6B
| Time1 | Time2 | Count |
|-------|-------|-------|
| 14    | 12    | 100   |
|       | 13    | 100   |
|       | 15    | 100   |
|       | 16    | 100   |
FIG. 6D
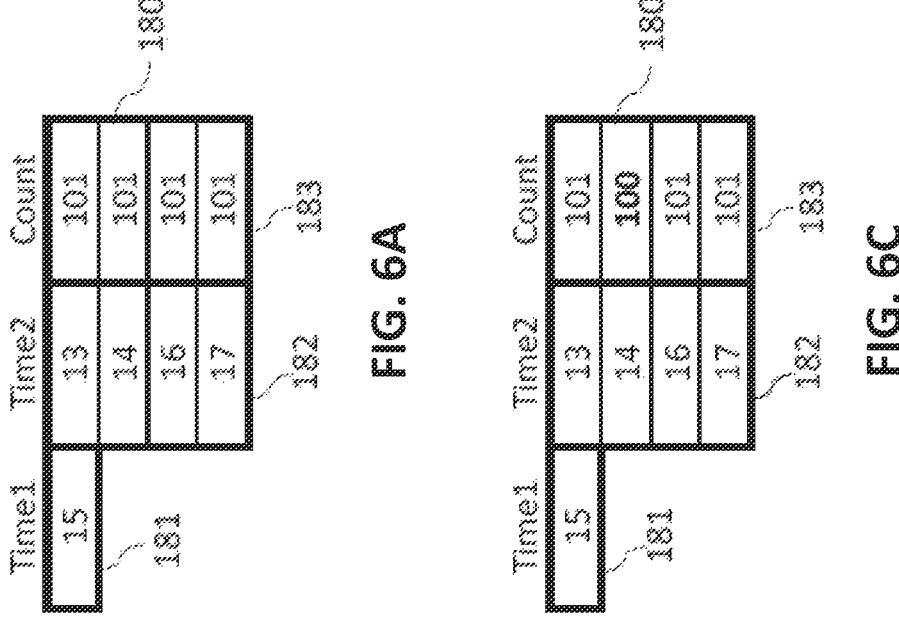
| Time1 | Time2 | Count |
|-------|-------|-------|
| 15    | 13    | 101   |
|       | 14    | 101   |
|       | 16    | 101   |
|       | 17    | 101   |
FIG. 6A
| Time1 | Time2 | Count |
|-------|-------|-------|
| 15    | 13    | 101   |
|       | 14    | 100   |
|       | 16    | 101   |
|       | 17    | 101   |
FIG. 6C

APPARATUS AND METHOD FOR SELECTING DYNAMIC LATENCY FOR LEVEL 2 CACHE

CROSS-REFERENCE TO RELATED APPLICATIONS

This application is:

1. a Continuation-in-Part of U.S. application Ser. No. 17/672,622, filed Feb. 17, 2022 ("First Parent U.S. Applications"), which in turn is a Continuation-in-Part of U.S. application Ser. No. 17/588,315, filed Jan. 30, 2022 ("Parent U.S. application");

2. a Continuation-in-Part of U.S. application Ser. No. 17/697,865, filed Mar. 17, 2022 ("Second Parent U.S. application"), which in turn is a Continuation-in-Part of Parent U.S. application; and 3. a Continuation-in-Part of U.S. application Ser. No. 17/697,870, filed Mar. 17, 2022 ("Third Parent U.S. application"), which in turn is a Continuation-in-Part of Parent U.S. application.

This application claims priority to:

1. the Third Parent U.S. Application;

2. the Second Parent U.S. Application;

3. the First Parent U.S. Application; and 4. the Parent Application;

collectively, "Priority References," and hereby claims benefit of the filing dates thereof pursuant to 37 C.F.R. § 1.78(a).

The subject matter of the Priority References, each in its entirety, is expressly incorporated herein by reference.

FIELD OF THE INVENTION

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

BACKGROUND

A microprocessor's performance can be improved by issuing multiple instructions (superscalar) per clock cycle and out-of-order ("OoO") execution of instructions. In a time-based microprocessor where a clock counter is used to track time, the instructions are issued to an execution queue with a preset execution time. Every instruction has an execution latency time, i.e., an add instruction takes 1 clock cycle for execution, a multiply instruction takes 2 clock cycles for execution, and a load instruction takes 4 cycles for execution. Based on the known execution latency time, the execution of and writing back of result data to a register file from instructions are planned ahead for all instructions. The latency of a processor's load instruction is often the determining factor in performance due to the high frequency of load instructions and their long latency. Typically, the load instruction has priority in the execution pipeline of the microprocessor. Load dependent instructions also typically have priority for execution as soon as the load data are available. The average load latency time is a function of data cache hit rate. Load dependent instructions are speculatively scheduled for execution based on the expected load latency time. If the load data is not in the data cache (data cache miss), then the speculatively scheduled dependent instruction(s) must be replayed. The replay can be selective for the instructions dependent load or can be for all instructions after the load which missed in the data cache. The latter case is simpler in implementation but with lower performance. The former case, i.e., selective replay, adds much more complexity to the dynamic scheduling of a traditional OoO superscalar microprocessor. The best-case latency time of the load instruction is set by the time required for a level-1 data cache ("L1DC") hit, but the latency becomes that of the level-2 cache ("L2C") in the event of a L1DC miss. The processor must reschedule the write back time of the load instruction based on latency time for accessing the level-2 ("L2") data cache. The latency time of the L2 data cache can be unpredictable due to many factors, such as conflicts due to multiple accesses from instruction cache, coherency, and multiple cores. Each time that the load result data does not return at the expected time, the processor may replay the load instruction and all dependent instructions. A better way of predicting the latency time of L2 data cache is needed in such a microprocessor, in order to improve the efficiency of instruction execution.

BRIEF SUMMARY OF THE INVENTION

The disclosed embodiment provides a processor with a time counter and a method for statically dispatching instructions to an execution pipeline with preset execution times based on a time count from the counter. The processor employs static scheduling for instructions in which the static scheduling algorithm is based on the assumption that a new instruction has a perfect view of all previous instructions in the execution pipeline, and thus it can be scheduled for earliest possible correct execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

In a time-based processor, all the above requirements are associated with time: (1) a time when all data dependencies are resolved, (2) and when the read buses are available to read source operands from a register file, (3) and when the functional unit is available to execute the instruction, and (4) when the write bus is available to write result data back to the register file.

In one embodiment, a time counter increments periodically, for example every clock cycle, and the resulting count is used to statically schedule the execution of instructions. Instructions have known throughput and latency times, and thus can be scheduled for execution based on a time count. For example, an add instruction with throughput and latency time of 1 can be scheduled to execute when any data dependency is resolved. If the time count is 5 and the add has no data dependency at time 8, the read buses are available to read data from the register file at time 8, the arithmetic logic unit (ALU) is available to execute the add instruction at time 9, and the write bus is available to write result data from the ALU to the register file at time 9, then the add instruction is scheduled to be dispatched to the ALU at time 8.

The latency time of load instructions is based on the data cache hit latency. The L1 data cache hit rate is typically about 80-90%, and the L2 cache hit rate is typically about 98-100%. The write back times of load instructions are modified dependent on the cache hit rates, most often from the L1DC latency time to L2C latency time. The L2 cache latency can be delayed by some number of cycles due to multiple accesses from instruction cache, coherency, and multiple cores.

In one embodiment, the processor keeps track of the most likely L2 latency time and adjusts the L2 latency time when a threshold is reached. If the L2 latency time is less than the expected time, then adjusting to the lesser time can improve performance by completing the load and dependent instructions in less time. If the L2 latency time is more than the expected time, then adjusting to the greater time reduces the number of replays and can reduce the power dissipation and improve the efficiency of instruction execution.

In one embodiment, a processor comprising a time counter storing a time count representing a current time of the processor, wherein the time count is incremented with each clock cycle of a clock circuit, a load store unit coupled to a data cache to fetch data for a first load instruction and wherein the data for the first load instruction is not in the data cache, the load store unit coupled to a level 2 cache to fetch the data for the first load instruction, wherein the level 2 cache is expected to return data with a predicted latency time, and wherein the predicted latency time corresponds to the time count, and a time tracker unit coupled to the load store unit to track an actual level 2 cache response time and to adjust the predicted latency time for subsequent accesses to the level 2 cache.

In one embodiment, a method implemented in a processor to select a different level 2 cache latency time than a current level 2 cache latency time based on a time tracker, wherein data from the level 2 cache is returned to a load store unit at a future time, wherein the future time is defined by the level 2 cache latency time and a time count in which the time count is incremented with each clock cycle of a clock circuit.

In one embodiment, a processor comprising: a time counter adapted to store a time count, the time count representing a current time of the processor, the time count being incremented as a function of each clock cycle of a clock circuit, a load store unit coupled to a data cache, the data cache being adapted to fetch data for a first load instruction, the data for a first load instruction being further characterized as absent from the data cache, the load store unit further coupled to a level 2 cache, the level 2 cache being adapted to fetch the data for a first load instruction, the level 2 cache being adapted to return data in accordance with a predicted latency time, the predicted latency time corresponds to the time count, and a time tracker unit coupled to the load store unit, the time tracker unit being adapted to track an actual level 2 cache response time and to adjust the predicted latency time for subsequent accesses to the level 2 cache.

BRIEF DESCRIPTION OF THE SEVERAL VIEWS OF THE DRAWINGS

Aspects of the present invention are best understood from the following description when read with the accompanying figures.

FIG. 6A, FIG. 6B, FIG. 6C, and FIB. 6D are an illustration of the dynamic adjustment of the L2 cache latency time.

DETAILED DESCRIPTION

Figure 1:
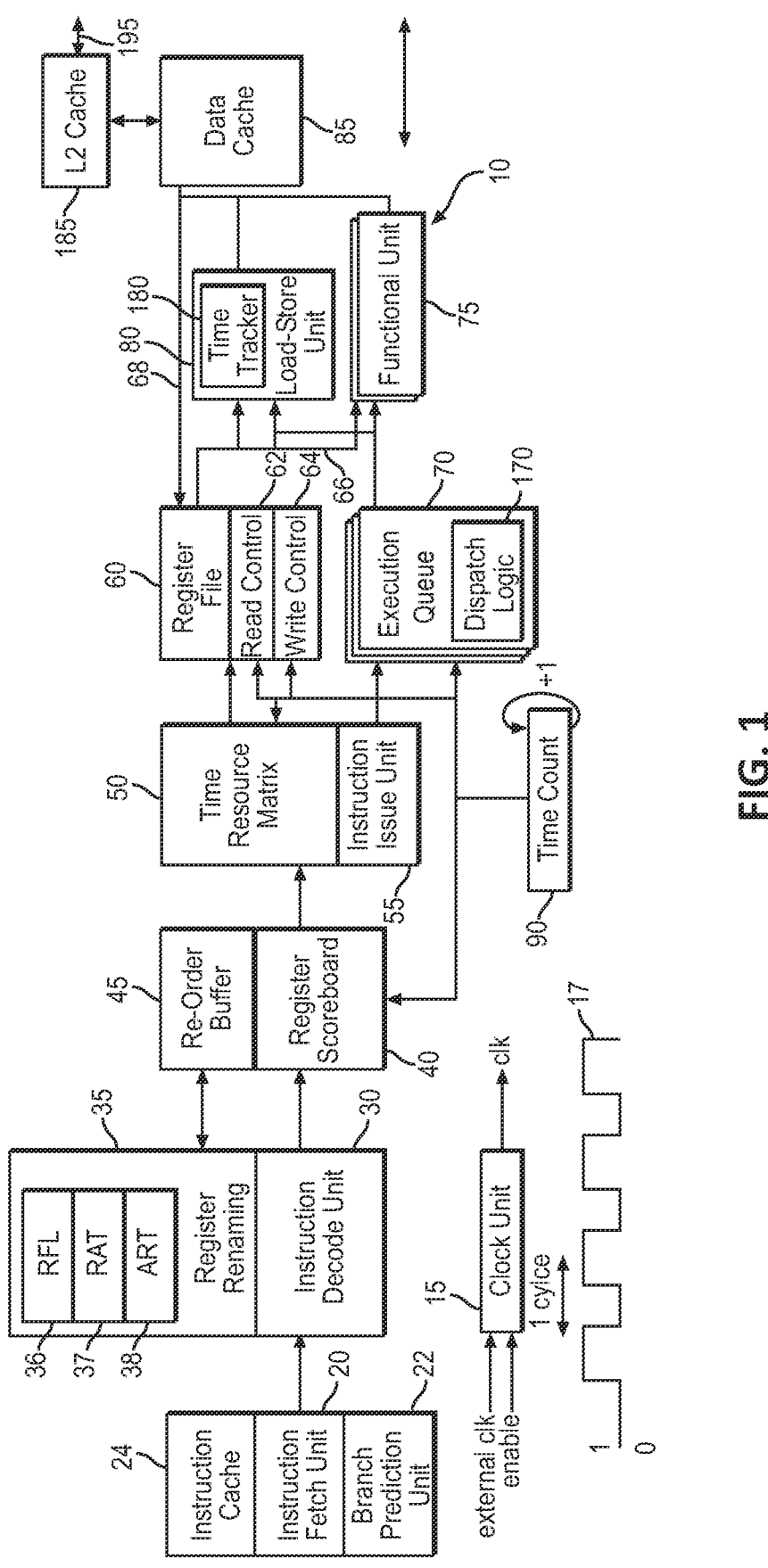
FIG. 1 is a block diagram illustrating a processor-based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor, the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 4 (based on a data cache hit), and the divide instruction has throughput and latency times of 32. Instructions can be scheduled with the preset times for execution based on the known throughput and latency times of all instructions. Unfortunately, the latency time of the load instruction can be greater than the data cache hit time. For example, the load latency time takes additional cycles for data bank conflict or external memory access time due to data cache miss.

FIG. 1 is a block diagram of a microprocessor-based data processing system. The exemplary system includes a microprocessor 10 having a clock unit 15, an instruction fetch unit an instruction cache 24, a branch prediction unit 22, an instruction decode unit 30, a register renaming unit 35, a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, a data cache 85, and a L2 cache 185. Dispatch logic 170, which is associated with execution queue 70 is described in further detail in connection with FIG. 5, supports replay of instructions. The microprocessor includes a plurality of read buses 66 to read data from the register file 60 to the functional units and load-store unit 80. In one embodiment, the load-store unit 80 includes a time tracker 180 to track the most likely time for fetching data from the L2 cache 185. The system also includes a plurality of write buses 68 to write result data from the functional units 75, the load-store unit 80, and the data cache 85, to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal, clk, of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further include an enable signal to disable the clock unit when the microprocessor is in an idle state or not used for instruction execution.

According to an embodiment, the microprocessor 10 also includes a time count unit 90 which stores a time count incremented every clock cycle. The time count unit 90 is coupled to the clock unit 15 and uses clk signal to increment the time count. A time count can be used in a processor to schedule an instruction for execution based on the best available time when the instruction is free of data dependency and resources are available. In an embodiment, the time count consists of 7 bits which increment every clock cycle from 0 to 127 and wrap around.

In one embodiment, the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle, e.g., time count of 27. The time count unit 90 is coupled to the register scoreboard 40, the time-resource matrix 50, the read control 62, the write control 64, and the plurality of execution queues 70. The register scoreboard 40 resolves data dependencies between the instructions. The time-resource matrix 50 checks availability of the various resources, which in one embodiment include the read buses 66, the functional units 75, the load-store unit 80, and the write buses 68. The read control unit 62, the write control unit 64, and the execution queues 70 receive the scheduled times for correct instruction execution from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, such that when the time count counts up to the future preset time, then the specified action will happen correctly, where the specified action is reading data from the register file 60, writing data to the register file 60, or issuing an instruction to a functional unit 75 for execution. The instruction issue unit 55 determines when the instruction is free of any data dependency and the resources are available to set the "preset times" for the instruction to be executed in the execution pipeline.

Figure 2:
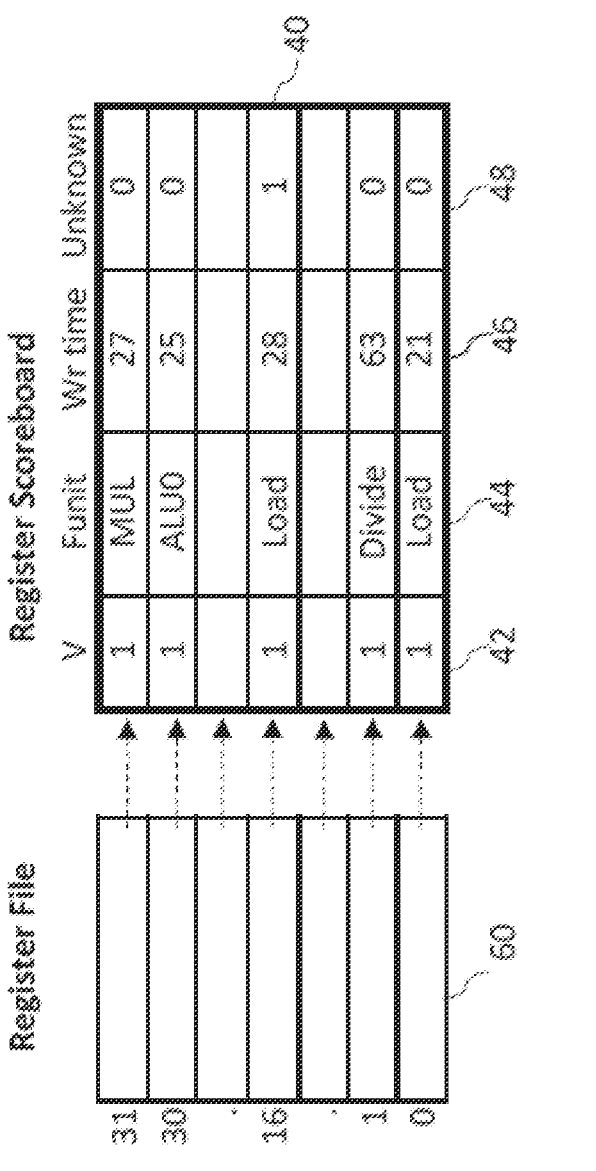
FIG. 2 is a block diagram illustrating a register file and a register scoreboard.

An instruction consists of three major portions: (1) an opcode to specify the operation by a specific functional unit, (2) one or more source operands referenced to one or more entries of a register file, and (3) a destination operand referenced to an entry of the register file. There are variations of the instruction where the source operand can be replaced by immediate data, and the destination operand is not needed in some instructions. The operands of an instruction are referenced to registers in the register file 60. If a later instruction has the same source register as the destination register of an earlier instruction, then the later instruction has a read-after-write ("RAW") data dependency. The later instruction must wait for completion of the earlier instruction before it can correctly start execution. The register scoreboard 40 keeps track of the write times of all registers in the register file 60, where the write time is based on the time count 90. FIG. 2 illustrates the register file 60 and the register scoreboard 40. In one embodiment, the register file has 32 registers, numbered as registers 0 to 31 as illustrated. Each register in the register file has a corresponding entry in the register scoreboard 40. The source operands of an instruction access the register scoreboard 40 to know when the result data of an earlier instruction will be available and the RAW data dependency will be resolved.

The register scoreboard 40 in FIG. 2 consists of valid bit field 42 to indicate a valid write back to the register file 60 at a future time in reference to the time count 90, as specified by the write time field 46 from a specific functional unit in the "Funit" field 44, unless the unknown field 48 is set. As examples illustrated in FIG. 2, register 0 is written back at time count 21 from the load-store unit 80. Register 1 is written back at time count 63 from the divide unit (one of the functional units 75). Register 30 is written back at time count 25 from the ALUO, (another of the functional units 75), etc. as illustrated in FIG. 2. Register 16 has the unknown bit set indicating that the load data from the load-store unit 80 have an unknown write-back time. The data is not available from the register file 60 until the next clock cycle of the write-back times, but the result data can be forwarded from the functional unit 44 in the register scoreboard 40. For example, if the value of the time count 90 is 19, then the load-store unit 80 produces the result data in 2 clock cycles for writing back to the register 0 of the register file 60 at time count 21. When the load instruction is issued, the write time is based on the data cache hit time to set the write time 46 of the register scoreboard 40. The load data may be delayed if the load access misses the L1 data cache 85, which will cause the write time 46 of the register scoreboard 40 to be modified based on the delay time. In an example, the write time 46 of the load may be modified based on the latency of L2 cache 185. The load data can be further delayed because of an L2 cache miss, and the delay time may be unknown, in which case the unknown field 48 of the register scoreboard 40 is set. A subsequent instruction with RAW data dependency on the destination register 16 of the load instruction is rescheduled (or replayed) as the write time for the destination register changes. The mechanism to replay instructions will be detailed later in the description of the execution queue 70.

In general, an instruction can be executed when (1) no data dependency with any previous instruction, (2) a read bus(es) is available to read data from the register file, (3) the functional unit is available to execute instruction, and (4) a write bus is available to write data to the register file. If all 4 conditions are met, then the instruction can be executed out-of-order with respect to all other instructions. Other data dependencies for the instructions include the write-after-write ("WAW") and write-after-read ("WAR"). The WAW data dependency occurs when 2 instructions write back to the same register. The second instruction cannot write result data back to the register until after the first instruction writes result data to the register. To address this WAW dependency, every destination register is renamed by the register renaming unit 35 where the second instruction writes result data to a different physical register from the first instruction. For example, if two instructions have the same destination register R7, and which are renamed to R38 and R52, then the two instructions can write to the registers R38 and R52 at any time. Without register renaming, both instructions will write back to the same R5 register. The register renaming unit 35 also eliminates the WAR data dependency where the later instruction cannot write to a register until the earlier instruction reads data from the same register. Since the destination register is renamed, the earlier instruction can read register at any time.

In one embodiment, the register renaming unit 35 consists of a register free list ("RFL") 36, a register alias table ("RAT") 37, and an architectural register table ("ART") 38. As an example, a processor can have 32-entry architectural registers and 64 temporary registers for renaming, for a total of 96 physical registers which is referred to as the register file 60. The RFL 36 keeps track of the temporary registers and assigns the temporary registers to the destination registers of instructions in the decode unit 30. The RAT 37 stores the latest renamed register of the architectural registers. For example, if register R7 is renamed to temporary register R38, then the RAT 37 keeps the renaming of R5 to R38 and any source operand of later instructions references to R5 will access R38 instead of R5. As the architectural register R5 is renamed to R38, eventually when the register R38 is retired from the re-order buffer 45, the architectural register R5 in the ART 38 becomes R38. The register R5 which was stored in the ART 38 is no longer used and released back to the RFL 36 as free register. Since the register file 60 has 96 entries, the register scoreboard 40 also has 96 entries to keep track of write times to the registers. The WAW and WAR data dependencies are no longer valid with register renaming, and the RAW data dependency is the only true data dependency which is handled by the register scoreboard 40.

Figure 3:
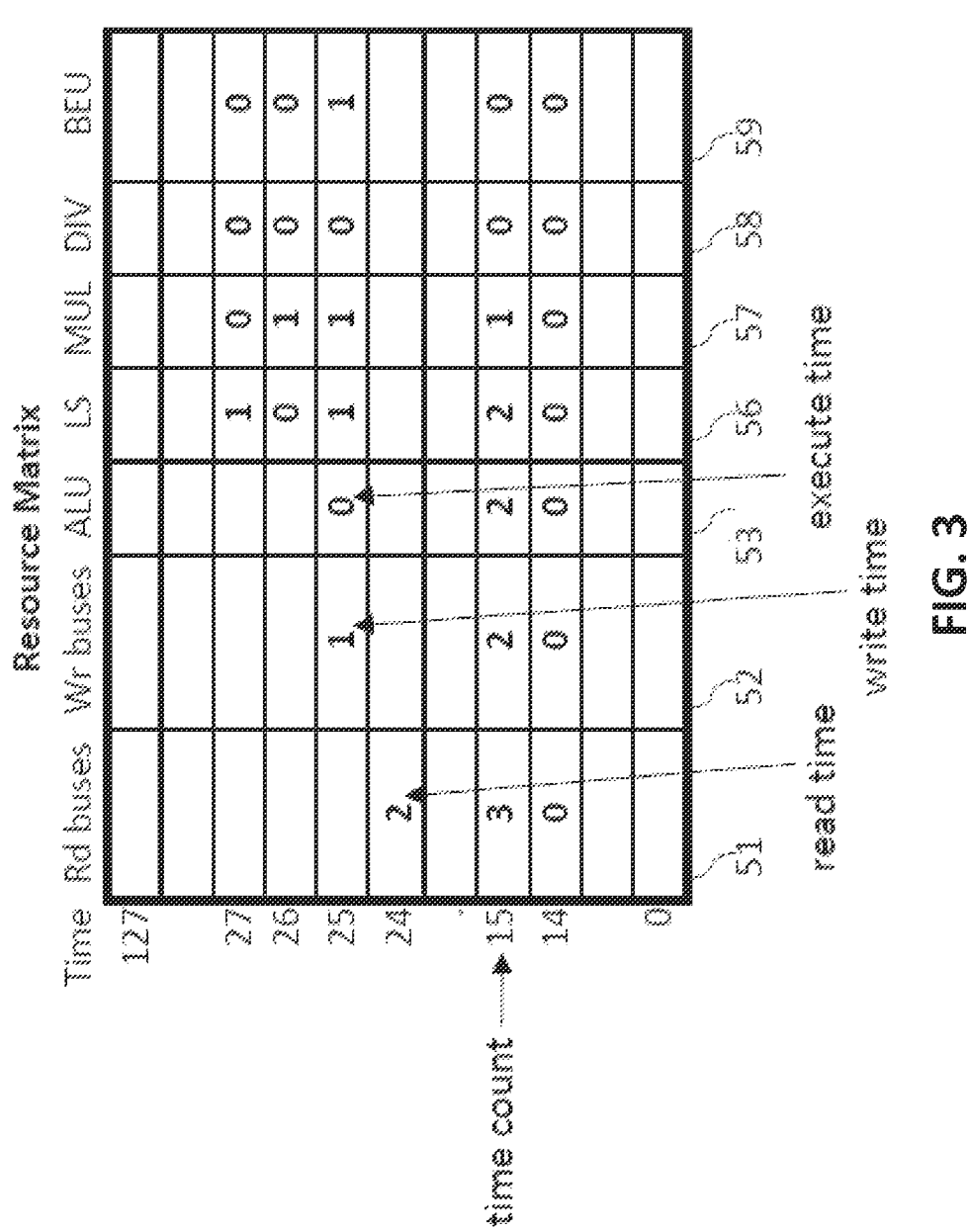
FIG. 3 is a block diagram illustrating a time-resource matrix.

The processor 10 solves the other three conditions for issuing an instruction using a time-resource matrix 50. FIG. 3 illustrates the time-resource matrix 50. The time-resource matrix includes the same number of time entries as the time counter 90. The columns in the time-resource matrix 50 represent the availability of specific resources. In the embodiment shown in FIG. 3, the time-resource matrix 50 is arranged to identify the availability of resources by identifying the resources that are busy, and specifically the read buses 51, the write buses 52, the ALUs 53, the load-store unit 56, the multiply unit 57, the divide unit 58, the branch execution unit (BEU) 59. These resources are an example, and if other functional units are provided by microprocessor 10 those are also included in the time-resource matrix 50. The bits in a column of the time-resource matrix 50 are the count of the busy resources. The resource counts are incremented when a resource is assigned to an issue instruction. Shown is data with a read time count of 24, an execution time count of 25, and a write time count of 25. When an instruction accesses the time-resource matrix 50 for availability of resources, the matrix 50 shows that at read time 24, 2 read buses are busy, at execution time 25, 1 load-store port, 1 multiply unit, and 1 BEU are taken for execution of previous instructions, and at write time 25, 1 write bus is busy. In one embodiment, the numbers of read buses, write buses, ALUs, load/store ports, multiply unit, divide unit, and BEU are 4, 2, 2, 1, 1, 1, and 1, respectively. If an add instruction with 2 source registers and 1 destination register is issued with read time of 24, execution time of 25, and write time of then the number of read buses 51 at time 24, write buses 52 at time 25, and ALUs 53 at time are incremented to 4, 2, and 1, respectively, when the ALU instruction is issued. The read bus 51 indicates that 2 read buses are busy, so the next 2 read buses 2 and 3 (in-order) are assigned to the source registers of the add instruction. The ALU unit 53 indicates that no ALU is busy, so the ALU 0 is assigned as functional unit for execution of the add instruction. The write bus 52 indicates that 1 write bus is busy, so the next in-order write bus 1 is assigned to write back data from ALU 0 to the register file 60.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. Instructions have known execution throughput time and latency times and set the busy bits in the time-resource matrix 50 accordingly when the instruction is issued from the instruction issue unit 55. Using the time count 90, an instruction is scheduled to read source operand data at a read time, to execute the instruction by a functional unit 75 at an execution time, and to write result data back to the register file 60 at a write time. For example, an ALU instruction: (1) the data dependencies are resolved from the register scoreboard 40 at time 24, (2) the read buses 66 are available to read data from the register file 60 at time 24, (3) the functional unit 75 is available to execute the instruction at time 25, and (4) the write bus 68 is available to write data to the register file 60 at time 25. The read time of the ALU instruction is determined by using the source operands to access the register scoreboard 40 to resolve the RAW data dependency. Read bus(es) 66 must be available to read source registers from the register file 60 at the read time by accessing read buses column 51 of the time-resource matrix 50. The execute time is always 1 cycle after the read time, and the ALUs column 53 is accessed for availability of the ALUs. The ALU latency time is 1 cycle in which the write time of the ALU instruction is determined by adding of the read time and latency time. A write bus 68 must be available to write ALU result data back to the register file 60 at write time by accessing write buses column 52. If all resources are available for the ALU instruction, then it is issued by the instruction issue unit 50 to an execution queue 70 and the resources in the time-resource matrix are set to busy according to the read, execute, and write times of the ALU instruction. The write time of the destination register of the ALU instruction is also written into the register scoreboard 40. The processor keeps track of the availabilities of the resources and registers of the register file. A register scoreboard is used to keep the time of when a register is written. A subsequent instruction sourcing the same register knows the exact time when the data dependencies are resolved and checks on the availability of the read bus(es), write bus, and functional unit to schedule the instruction.

In another embodiment, two read times, two execution times, and two write times are used per instruction with expectation that one set of times is free of conflict, increasing the chance for instruction issuing. In another embodiment, the busy bits are implemented as per individual resource, i.e., 5 read buses have 5 busy bits. The busy bits in the time-resource matrix 50 are reset to zero when the time count is incremented. For example, all resource counts of row 14 in FIG. 3 are reset when the count is incremented to 15 and all busy bits of row 15 will be reset in next cycle.

The load instruction latency time is based on L1 data cache hit time which is accurate about 85% of the time. If the load data is not in the data cache 85, then the load request is sent to L2 cache 185 to read data, and the load instruction is replayed using the L2 cache latency time. The write time 46 in the register scoreboard 40 is modified to the new write time. The load instructions are issued from the instruction issue unit 55 with the expectation of data being in the data cache 85 (i.e., a data cache hit). In one embodiment, when the data is not present in the data cache 85, then the load instruction changes the write time in the register scoreboard 40 for the latency time of an L2 cache. The instructions that are dependent on the destination register of the replayed load instruction are also replayed. The same procedure is used for replaying instructions where the replay read time, replay execute time, and replay write time check the time-resource matrix 50 for availability of resources. The replayed instructions are statically scheduled for execution with the same procedure as issued instructions.

Figure 4B:
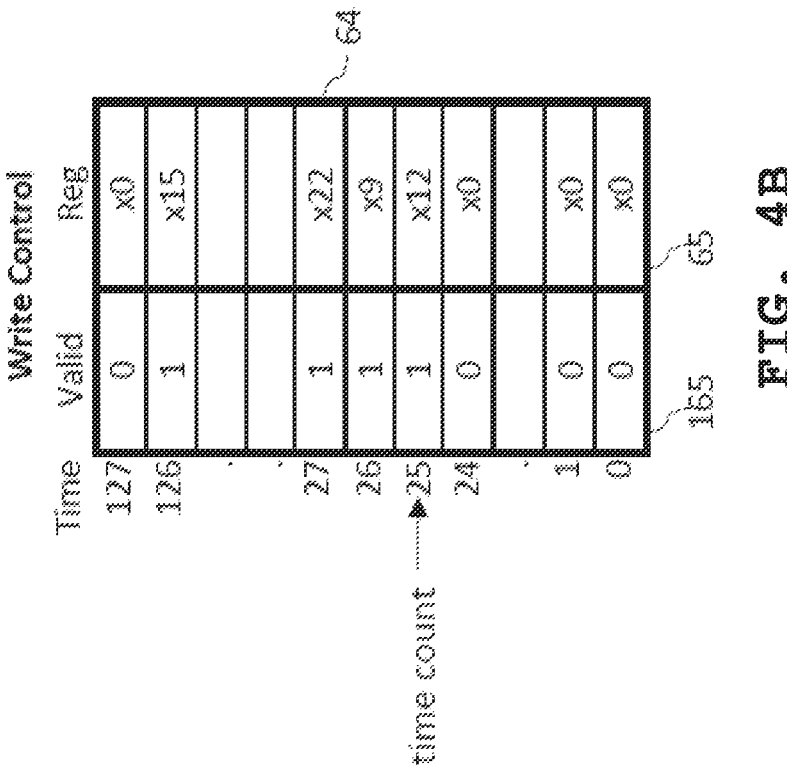
FIGS. 4A and 4B are block diagrams illustrating a read bus control and a write bus control.
Figure 4A:
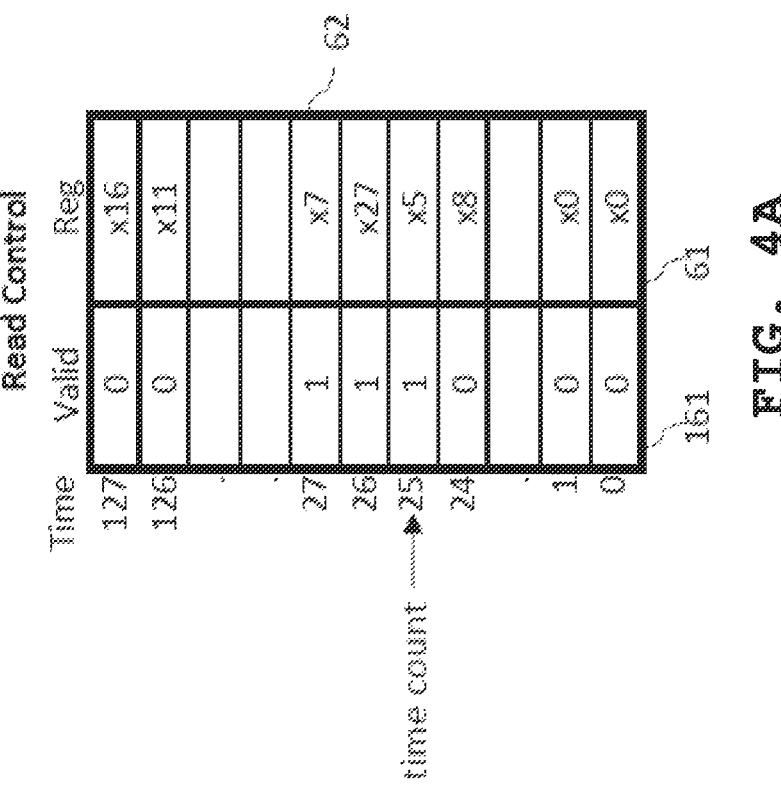

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61. The column in the write control unit 64 represents the destination registers on the write bus 65. In another embodiment, the read control unit 62 and the write control unit 64 include another column of valid bits 161 and 165 to indicate a valid read or write, respectively. As illustrated in FIGS. 4A and 4B, when the time count is incremented from 24 to 25, the valid bits 161 and 165 are reset and the valid bits of row 25 will be reset in the next clock cycle. FIGS. 4A and 4B show a single read bus 66 and a single write bus 68, respectively. If, however, 4 read buses and 3 write buses are implemented, then the functionality of FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set and the write time 46 is greater than the time count 90, then the instruction is replayed where the write time 46 is the new read time for the replay instruction. The write time 46 could have been modified by a load instruction. The replayed instruction will access the time-resource matrix 50 to reissue the instruction to the replay execution queue. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly in FIG. 4B, the register x12 from the register field 65 of the write control unit 64 at time count of 25 is used to write to the register file 60. The register x12 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
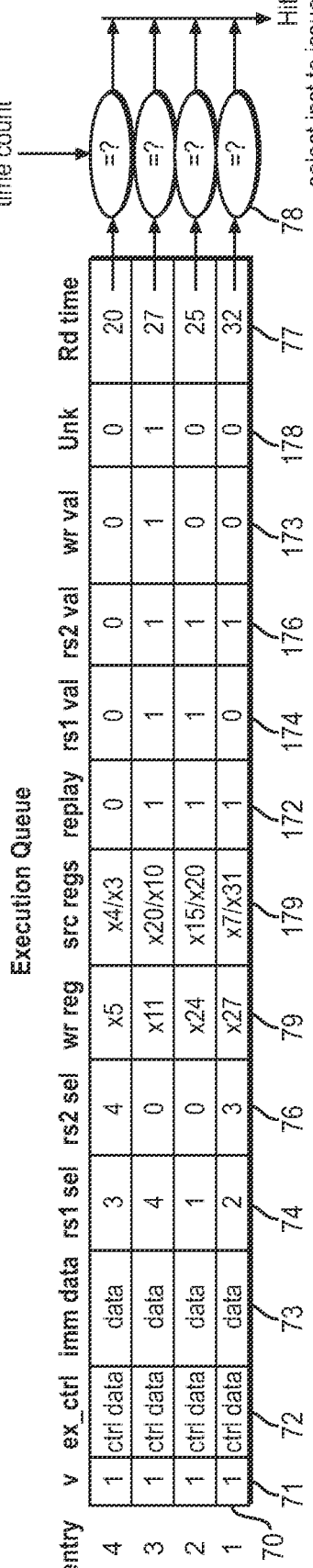
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. The entry numbers are listed on the left for each row of the execution queue 70. Each entry is an instruction waiting for execution by one of the functional units 75 or the load/store unit 80 according to the time count in the read time column 77. Each entry in the execution queue 70 preferably consists of the following fields: valid bit 71, control data 72, immediate data 73, first source register select 74, second source register select 76, read time 77, destination register number 79, source register numbers 179, replay valid 171, first source register valid 174, second source register valid 176, write valid 173, and unknown time 178. The valid bit 71 indicates that the entry is valid in the execution queue 70. The control data 72 specifies the specific operation to be performed by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the entry number 4 is issued at time count 20, the entry number 3 is issued at time count 25, the entry number 2 is issued at time count 27, and the entry number 1 is issued at time count 32. In another embodiment, the read time 77 can be the same of plurality of entries in the execution queue 70 as long as different functional units 75 are selected for execution. The dispatch logic 170 takes the hit signals from the comparator 78 along with information from the corresponding hit entry and information from the read control unit 62 to select source operand data to send to the functional unit 75. The instruction could be delayed due to new write time in the register scoreboard 40 in which case the dispatch logic 170 sets up the replay fields of the selected entry. The destination register number 79 and the source register numbers 179 are referenced to registers in the register file 60. These register numbers are used only for replaying of an instruction.

The write control unit 64 is responsible for directing the result data from a functional unit 75 to a write bus 68 to write to the register file 60. The execution queues 70 are only responsible for sending instructions to the functional units 75 or the load-store unit 80.

The entry number 4 (shown as the top row in FIG. 5) is normal dispatching of an instruction to a functional unit 75 at read time 20, and the first source operand data is from 3rd read bus 66 as indicated by the first source register select 74 and the second source operand data is from 4th read bus 66 as indicated by the first source register select 76. In one embodiment, the control data 72 includes identification of a functional unit 75 for dispatching of the instruction. The control data 72 and immediate data 73 are dispatched to the functional unit. The valid bit 71 is reset at time 21 from the read time 77 when the instruction is dispatched to the functional unit 75. The other fields (172, 174, 176, 173, 178) of the entry number 4 are not used as the instruction is not replayed.

The entry number 1 of FIG. 5 (shown as the bottom row) illustrates replaying of an instruction because the write time 46 in the register scoreboard 40 is greater than the time count for the first source register. The read port control 62 accesses the source register information from the register scoreboard 40 and sends to the dispatch logic 170 for determining if the instruction is replayed. In this example, the second source operand data are valid but the first source operand data are not valid. The second source register valid bit 176 is set and the second source operand data are written into immediate data field 73. The replay instruction needs to fetch only the first source operand data for execution. The write time 46 in the register scoreboard 40 for the first source register is used as the new read time to replay the instruction. The write times 46 of the register scoreboard 40 for both source registers can be greater than the time count 90 and the read time for replaying instruction is based on the longest write time 46. The dispatch logic 170 also calculates the execution and write times based on the new read time and accessing the time-resource matrix 50. If the resources are available, then the new read time is written into the read time 77. Note that the read time entry of the read port control 62 is written with the source register(s) and the write time entry of the write port control 64 is written with the destination register which is from the write register 79 of the execution queue 70. If at least one resource is not available, then the unknown bit 48 in the register scoreboard 40 is set for the destination register 79 and the unknown bit 178 in the execution queue 70 is set to cause the instruction to be replayed by the retire order of instruction. In another embodiment, two read times, two execution times, and two write times are used per replay instruction with the expectation that one set of times is free of conflict, increasing the chance for instruction issuing. In another embodiment, the re-order buffer 45 in processor 10 is used to track the order of instructions as they are issued from the instruction decode unit 30 to retire the instructions in-order after the instructions are out-of-order executed. The re-order buffer is coupled with the execution queues 70 to indicate that the unknown entry is the next instruction to be retired in-order. Note that the control data field 72 of the execution queue 70 includes the re-order buffer entry to synch with the re-order buffer retire entry. At the retire order, the unknown entry of the execution queue 70 continuously accesses the time-resource matrix 50 for available resources until the unknown entry can be dispatched to functional unit 75 in the next cycle. In another embodiment, the arrival of L2 miss data can wake up an entry of the execution queue 70 to process load miss data regardless of the unknown status 178. The execution queues 70 must keep the source and destination register numbers in the write register field 79 and source registers field 179 in order to access the register file 60 and the register scoreboard 40.

The entry number 3 of FIG. 5 illustrates replaying of a load instruction with unknown time. The external memory (not shown) outside of the processor 10 returns load data at some later time through external bus 195 of FIG. 1, writes into the immediate data field 73, and write valid bit 173 of the entry number 3 of the execution queue 70 is set. At the retire order, if the write valid bit 173 is not valid, then the entry number 3 must wait until the write valid bit 173 is set. If the write valid bit 173 is set, then the unknown entry continuously accesses the time-resource matrix 50 for available write buses 52 and replay write buses 152 until the immediate data 73 can be written to the register file 60 with the destination register in the write register 79 in the next cycle. Since no issue or replay instruction uses the write buses resources of the time-resource matrix 50 in the next clock cycle, in this example the entry number 3 of the execution queue 70 can use any available write bus resource in the next cycle without any conflict. Along with writing data back to the register file 60, the valid bit 42 in the register scoreboard 40 and the valid bit 71 of the entry number 3 of the execution queue 70 are reset.

The entry number 2 of FIG. 5 illustrates replaying of a load instruction where the load data delay is detected and does not write load data back to the register file 60 at the expected write time. As an example, the data cache miss is not known at the time the load instruction is dispatched from the execution queue 70 to the load-store unit 80. The entry number 2 remains valid until the cycle where the data cache hit or miss is determined at which time the valid bit 71 of the entry number 2 can be reset or remain set for replaying. It is important for the entry in the execution queue 70 to remain valid until the load is completed. The L2 cache latency time updates the write time 46 in the register scoreboard 40 for the destination register and the read time 77 of the entry number 2 of the execution unit 70. Both first and second source register valid bits 174 and 176 are set to indicate that the rs1 and rs2 source operand data are not needed for this instruction. The write valid field 173 indicates that this load instruction is waiting for the load data. When the read time 77 of the entry number 2 matches the time count 90, the load data from L2 cache should be valid and is written back to the register file 60, and the valid bit 42 of the register scoreboard 40 and the valid bit 71 of the entry number 2 of the execution queue 70 are reset. The L2 cache can be a cache miss and not return data at the expected time, in which case the unknown bit 178 of the execution queue 70 and the unknown bit 48 of the register scoreboard 40 for the destination register are set. This case is illustrated above for the entry number 3 of FIG. 5. The data cache miss is only one example of a load data delay. As examples, other load data delays can arise from a data bank conflict when more than one load data requests are to the same bank and an ECC 1-bit correctable error delay, as well as a combination of multiple load data delays.

FIG. 6 illustrates examples of the time tracker 180 of the load-store unit 80 to dynamically adjust the response time from the L2 cache 185 when the load data is not in the data cache 85. The latency time of the L2 cache 185 is based on the expected access time but the latency time can vary due to data bank conflicts, limitation of the read and write buses of the data buffers, multiple requests to the same cache. The causes for delay of the access time are just examples. Note that the L2 cache 185 of FIG. 1 can be shared with other microprocessors instead of a private L2 cache for microprocessor 10. The shorter latency time can improve the performance but if the result data take longer time to return then replaying of the load instructions the second time and unnecessary tying up the resources in the time-resource matrix 50. Tying up the resources in the time-resource matrix 50 can prevent other instructions from using the resources. The time tracker in FIG. 6A includes a time1 181, a time2 182, and a count 183. The time1 181 is the current L2 cache latency time which is initialized to the expected latency time of the L2 cache 185. The time2 182 are alternate L2 cache latency times that can be adjusted from time1 181. In one embodiment, the time2 182 are +/−1 and 2 from time1 181. As an example, in FIG. 6A, the time1 181 is set to 15 and time2 182 are set to 12, 13, 16, and 17. The count 183 is the bimodal prediction counter where the most significant bit selects time1 181 or time2 182. In the example, a "1" in the count 183 selects the time1 181 as the L2 cache latency time and a "0" in the count 183 selects the time2 182 as the L2 cache latency time. The other 2 least significant bits are the saturation count meaning that the count increments from 00, to 01, to 10, and 11. The 2-bit count signifies strength of the predicted time, very weakly, weakly, strongly, and very strongly, respectively. The count is saturated at 11 and does not wrap around. The current selected time1 181 are comparing to alternate times in time2 182. The counts 183 is used to adjust to a new time when the count is decremented to the weakly state. If the time1 181 is correct, then count 183 is incremented as shown in FIG. 6B and saturated at 11. If the time1 181 is incorrect and the correct time is 14, then the count 183 is decremented until 00 as shown in FIG. 6C. When the count is at "00", another decrement with the correct time at 14 flips the most significant bit where the new time is set for time1 181 at 14 and the time2 182 are +/−1 and 2 from time1 181 with the new count 183 are initialized to 101.

The number of bits of the count 183 is for illustrating purposes and can be more or fewer bits. The number of times in time1 182 is for illustrating purposes and can be more or fewer times. In another embodiment, the initial count 183 can be set by another value of "110" or "111" because it is the supposedly best latency time for L2 cache 185. The bimodal count is an example for dynamically adjusting the L2 cache time, other algorithms can be used. In one embodiment, one such algorithm is having a counter for each possible L2 latency time, i.e. 13, 14, 15, 16, 17, and increment the count for the correct time while decrement the count for the incorrect time with saturation at 0 and maximum count. The time with the highest count is selected as the new L2 cache latency time. The initial count is set at maximum for the best latency time and 0 for all other times.

Referring back to FIG. 1, the microprocessor system 10, the instruction fetch unit 20 fetches the next instruction(s) from the instruction cache 24 to send to the instruction decode unit 30. One or more instructions can be fetched per clock cycle from the instruction fetch unit 20 depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit 20 is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

Each of the units shown in the block diagram of FIG. 1 can be implemented in integrated circuit form by one of ordinary skill in the art in view of the present disclosure.

With regard to one embodiment of this invention, time counter 90 is a basic N-bit wrap-around counter incrementing by 1 every dock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagrams of the various figures can be implemented as software representations, for example in a hardware description language (such as for example Verilog) that describes the functions performed by the units described herein at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. A processor comprising:
a time counter storing a time count representing a current time of the processor, wherein the time count is incremented with each clock cycle of a clock circuit;
a load store unit coupled to a data cache to fetch data for a first load instruction and wherein the data for the first load instruction is not in the data cache;
the load store unit coupled to a level 2 cache to fetch the data for the first load instruction, wherein the level 2 cache is expected to return data with a predicted latency time, and wherein the predicted latency time corresponds to the time count; and

16 a time tracker unit coupled to the load store unit to track an actual level 2 cache response time and to adjust the predicted latency time for subsequent accesses to the level 2 cache.

2. The processor of claim 1 further comprising:
a register scoreboard storing a write time of a register in a register file, wherein the write time is a future time of the time count;
an instruction decode unit coupled to the register scoreboard, wherein the instruction decode unit reads at least one write time for source operands of an instruction from the register scoreboard, and uses the at least one write time to determine an execution time for the instruction; and
a time-resource matrix unit comprising a plurality of time-resource registers for storing information relating to available resources for each time count of the time counter, wherein the plurality of time-resource registers store information for resources that include at least one of:
a plurality of read buses;
a plurality of write buses; and
a plurality of each type of functional unit.

3. The processor of claim 2 further comprising:
a read bus control unit having registers storing time count entries specifying when operands may be read and transported on a read bus;
wherein the read bus control unit further accesses the register scoreboard to determine availability of a first register in the register file;
wherein if the write time of the first register in the register file is the same as the time count, then data is forwarded from a functional unit instead of being read from the register file; and
wherein if the write time of the first register in the register file is greater than the time count then the instruction is replayed.

4. The processor of claim 3 further comprising:
a write bus control unit having write bus control registers storing time count entries specifying when result data may be transported on a write bus and written to a second register of the register file; and
wherein the write bus control unit further accesses the register scoreboard to clear a valid bit if the write time stored in the write bus control register is the same as the time count.

5. The processor of claim 4 further comprising:
an execution queue which stores a plurality of instructions, each instruction including a read time which is represented by a future time count;
wherein the execution queue dispatches instructions to at least one functional unit;
wherein the read bus control unit is synchronized with the read time in the execution queue to send source operand data to the functional unit;
wherein each instruction includes a replay bit, and when said replay bit is set, the read time is updated with a new read time which is represented by the future time count;
wherein the execution queue dispatches instructions to at least one functional unit;
wherein the replayed instruction accesses the time-resource matrix for available resources; and
wherein if at least one resource is not available at read time an unknown bit of the instruction is set.

6. The processor of claim 5:

wherein, when an instruction in the execution queue is a load instruction and the replay bit is set when the load data are delayed and the read time of the instruction in the execution queue is updated based on another predicted latency time and the time count; and wherein the load data returns at the read time to complete the load operation by writing load data to the register file; and wherein the load data do not return at the read time in which case the unknown bit of the instruction is set.

7. The processor of claim 6:

wherein the load data delay is due to the data cache miss and the load data is from the level 2 cache; and wherein the level 2 cache returns data at a predicted time based on the time count.

8. The processor of claim 1:

wherein the time tracker unit includes a default current level 2 cache latency time and an alternate level 2 cache latency time; and wherein the alternate level 2 cache latency time is selected as the new default level 2 cache latency time if the alternate time response occurs more frequently than the current default level 2 cache latency time.

9. The processor of claim 8:

wherein the time tracker unit consists a bimodal counter for a pair of times;

wherein one of the times is the current level 2 cache latency time and a second time; and wherein the bimodal counter can select the second time as the new level 2 cache latency time.

10. A processor comprising:

a time counter adapted to store a time count, said time count representing a current time of said processor, said time count being incremented as a function of each clock cycle of a clock circuit;

a load store unit coupled to a data cache, said data cache being adapted to fetch data for a first load instruction, said data for a first load instruction being further characterized as absent from said data cache;

said load store unit further coupled to a level 2 cache, said level 2 cache being adapted to fetch said data for a first load instruction, said level 2 cache being adapted to return data in accordance with a predicted latency time, said predicted latency time corresponds to said time count; and a time tracker unit coupled to said load store unit, said time tracker unit being adapted to track an actual level 2 cache response time and to adjust said predicted latency time for subsequent accesses to said level 2 cache.

11. The processor of claim 10 further comprising:

a register scoreboard adapted to store a write time of a register in a register file, said write time being characterized as a future time count value of said time counter;

an instruction decode unit coupled to said register scoreboard, said instruction decode unit being adapted to read at least one write time for a source operand of an instruction from said register scoreboard, said instruction decode unit being further adapted to determine an execution time for said instruction as a function of said at least one write time for a source operand; and a time-resource matrix unit comprising a plurality of time-resource registers, said plurality of time-resource registers being adapted to store information relating to available resources for each time count of said time counter, said resources comprising at least one of:

a plurality of read busses;

a plurality of write busses; and a plurality of each type of functional unit.

12. The processor of claim 11 further comprising:

a read bus control unit adapted to:

store time count entries, said time count entries being further characterized as time counts when operands may be read and transported on a read bus;

determine an availability of a first register in a register file by accessing said register scoreboard;

forward data from a functional unit if said write time is equal to said time count; and replay said instruction if said write time is greater than said time count.

13. The processor of claim 12 further comprising:

a write bus control unit adapted to:

store time count entries, said time count entries being further characterized as time counts when result data may be transported on a write bus and written to said register file; and clear a valid bit of said register scoreboard if said write time is equal to said time count.

14. The processor of claim 13 further comprising:

an execution queue adapted to:

store a plurality of instructions, each of said plurality of instructions comprising:

a read time, said read time being characterized as a future time count value of said time counter;

a replay bit; and an unknown bit;

update said read time with a new read time when said replay bit is set;

dispatch said plurality of instructions to at least one functional unit, accessing said time-resource matrix to determine available resources if said replay bit is set; and setting the unknown bit if at least one resource is not available at said read time; and said read bus control unit being further adapted to synchronize with said read time of each of said plurality of instructions in said execution queue when sending operand data to said functional unit.

* * * * *